United States Patent
Dusberger et al.

(10) Patent No.: US 9,104,946 B2
(45) Date of Patent: Aug. 11, 2015

(54) SYSTEMS AND METHODS FOR COMPARING IMAGES

(71) Applicant: CANON KABUSHIKI KAISHA, Tokyo (JP)

(72) Inventors: Dariusz T. Dusberger, Irvine, CA (US); Bradley Scott Denney, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 253 days.

(21) Appl. No.: 13/651,827

(22) Filed: Oct. 15, 2012

(65) Prior Publication Data

US 2014/0105509 A1   Apr. 17, 2014

(51) Int. Cl.
*G06K 9/68*    (2006.01)
*G06K 9/46*    (2006.01)

(52) U.S. Cl.
CPC .................. *G06K 9/4676* (2013.01)

(58) Field of Classification Search
CPC ... G06K 9/6256; G06K 9/66; G06K 9/00664; G06K 9/6218; G06F 17/30265; G06T 2207/10016; G06T 5/40
USPC .................. 382/218, 159, 224–225, 190, 168
See application file for complete search history.

(56) References Cited

U.S. PATENT DOCUMENTS 7,801,392 B2 * 9/2010 Koyama et al. ............... 382/305
7,885,466 B2    2/2011 Perronnin 2010/0189354 A1  7/2010  de Campos
2010/0191743 A1  7/2010  Perronnin
2010/0226564 A1  9/2010  Marchesotti

OTHER PUBLICATIONS

Xiao Wu et al., Near-Duplicate Keyframe Retrieval with Visual Keywords and Semantic Context, CIVR'07, Jul. 9-11, 2007.
Praveen Dasigi et al., Retrieval from Image Datasets with Repetitive Structures, Proceedings of National Conference on Communications (NCC-2008), IIT Bombay, Feb. 2008.
Mikaela Keller, Machine Learning Approaches to Text Representation using Unlabeled Data, Present'ee a la Facult'e Sciences et Techniques de l'Ing'enieur 'Ecole Polytechnique F'ed'erale de Lausanne (2006).
Valentin Jijkoun & Maarten de Rijke, Vector Space Model, Informatics Institute, University of Amsterdam, 2006.
David M. Chen et al, Inverted Index Compression for Scalable Image Matching, DCC'10 (2010).
Jun Yang et al., Evaluating Bag-of-Visual-Words Representations in Scene Classification, Carnegie Mellon University, Computer Science Department, 2007.
Christopher D. Manning et al., An Introduction to Information Retrieval, Chapter 6, Cambridge University Press, 2009.
Apache Lucene, downloaded from http://lucene.apache.org/core/3_6_1/api/all/index.html, Oct. 10, 2012.

* cited by examiner

*Primary Examiner* — Ruiping Li
(74) *Attorney, Agent, or Firm* — Canon U.S.A., Inc. IP Division

(57) ABSTRACT

Systems and methods for scoring similarity count a number of matching visual words between a query image and a candidate image, generate an image similarity score for the query image and the candidate image based at least in part on the number of matching visual words, and generate a normalized image similarity score based at least in part on the image similarity score and one or more of a complexity of the query image and a complexity of the candidate image.

20 Claims, 6 Drawing Sheets

SYSTEMS AND METHODS FOR COMPARING IMAGES

BACKGROUND

1. Field

The present disclosure generally relates to image analysis and representation.

2. Background

The Bag-Of-Words (also referred to herein as "BOW") image representation model quantizes local features (e.g., SIFT descriptor, SURF descriptor, HOG) by representing local features with respective visual words, and an image may be represented with a BOW vector. In some image retrieval systems, the BOW representation is used to represent both a query and each available database image. The available database images can be efficiently indexed and searched using an inverted file system (e.g., inverted index).

SUMMARY

In one embodiment, an image similarity scoring method comprises counting a number of matching visual words between a query image and a candidate image, generating an image similarity score for the query image and the candidate image based at least in part on the number of matching visual words, and generating a normalized image similarity score based at least in part on the image similarity score and one or more of a complexity of the query image and a complexity of the candidate image.

In one embodiment, a device comprises one or more processors, and one or more computer readable media coupled to the one or more processors, the one or more computer-readable media storing instructions that, when executed by the one or more processors, cause the processors to perform operations comprising counting a number of matching visual words between a query image and a candidate image; weighting the number of matching visual words between the query image and the candidate image, wherein the weighting is based at least in part on a complexity of the query image; and scoring an image similarity of the query image and the candidate image based at least in part on the weighted number of matching visual words.

In one embodiment, one or more computer-readable media store instructions that, when executed by one or more computing devices, cause the one or more computing devices to perform operations comprising counting a number of matching visual words between a query image and a candidate image; weighting the number of matching visual words between the query image and the candidate image, wherein the weighting is based at least in part on a complexity of the query image; and scoring an image similarity of the query image and the candidate image based at least in part on the weighted number of matching visual words.

DESCRIPTION

The following disclosure describes certain explanatory embodiments. Additionally, the explanatory embodiments may include several novel features, and a particular feature may not be essential to practice the systems and methods described herein.

Figure 1:
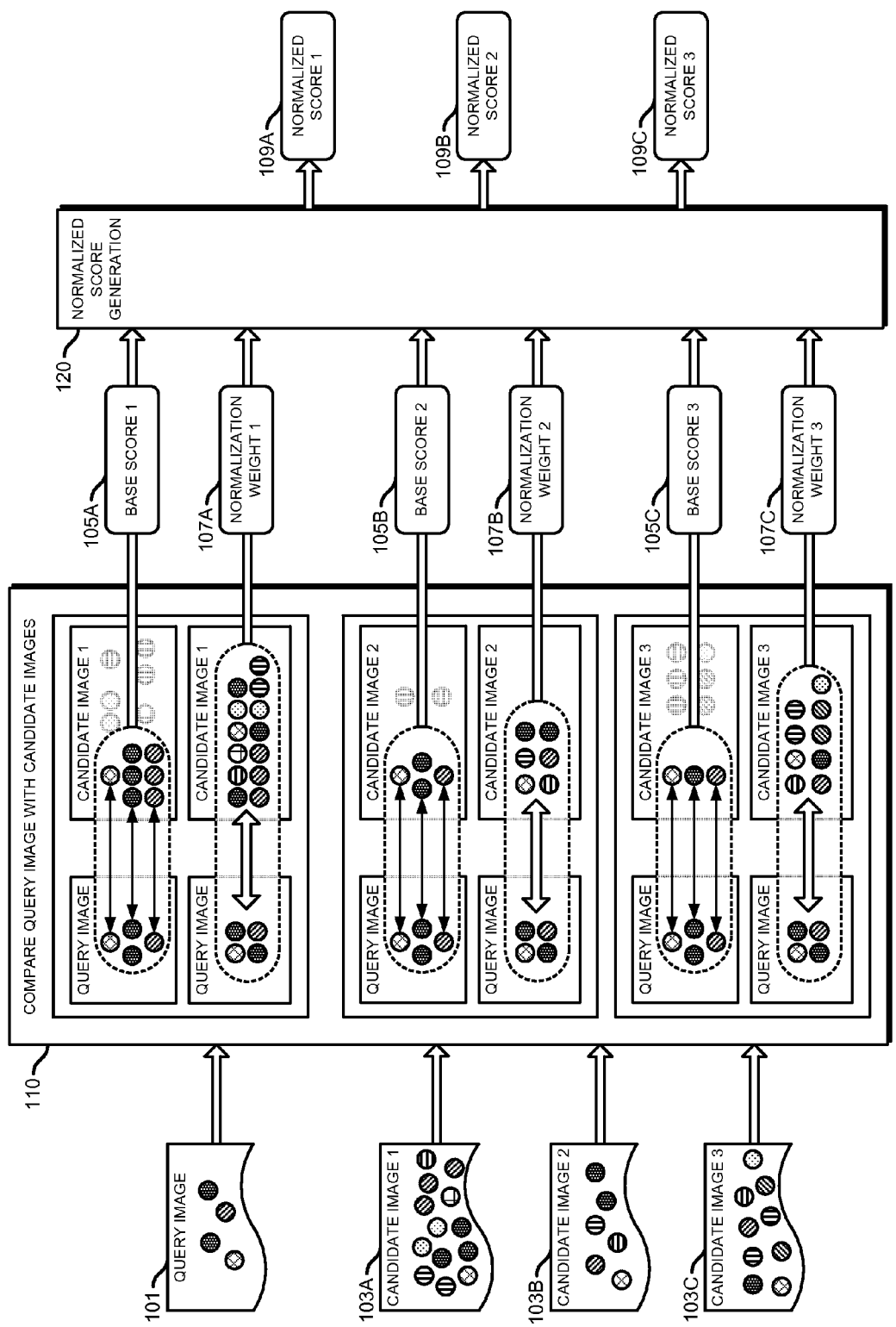
FIG. 1 illustrates an example embodiment of the flow of operations in an image analysis system.

FIG. 1 illustrates an example embodiment of the flow of operations in an image analysis system. The operations may be implemented by one or more computing devices (e.g., desktops, laptops, servers, tablets, smartphones). When performing an image search, measures (e.g., cosine, tf-idf, and histogram intersection) that compare BOW vectors for similarity favor candidate images/documents that share more common visual words (e.g., features, feature clusters) with the query image. However, these measures tend to favor (e.g., score higher) images/documents that have a greater number of visual words because a larger image/document has a higher probability of containing a given visual word. The system that is illustrated in FIG. 1 performs score normalization to correct for the bias. For documents, these corrections may result in increased final scores for shorter documents, according to the premise that shorter documents are more on topic when searched using a short text query. For images, the complexity of the image, which may be proportional to the number of visual words that appear in the image (e.g., features, feature clusters), may be used to correct the bias. For example, a less-complex candidate image may be favored, or a candidate image with a complexity similar to the complexity of the query image may be favored.

In block 110, a query image 101 is compared to one or more candidate images 103 (e.g., first candidate image 103A, second candidate image 103B, and third candidate image 103C) to generate respective base scores 105 (e.g., first base score 105A, second base score 105B, and third base score 105C) and normalization weights 107 (e.g., first normalization weight 107A, second normalization weight 107B, third normalization weight 107C). In some embodiments, for example, to generate a first base score 105A, the features in the query image 101 are compared with the features in a first candidate image 103A to determine the count of matching image features, and the first base score 105A is generated based on the count of matching local image features. In other embodiments, to generate a first base score 105A, a global image feature (e.g., edge histogram, fuzzy color texture histogram, dominant color, CEDD, etc.) is calculated for the query image 101 and is compared with the global feature of the first candidate image 103A. Also, in other embodiments, one or more combinations of local and global features in the query image 101 and the first candidate image 103A are compared to generate a first base score 105A. Also, a first normalization weight 107A may be generated based on a complexity (e.g., total number of features in the image, total number of features in a portion of the image) of the first candidate image 103A, on a complexity of the query image 101, or on both (e.g., a comparison of the complexity of the query image 101 with the complexity of the first candidate image 103A). For example, the first normalization weight 107A may be based on the difference between the number of features in the query image and the number of features in the first candidate image 103A.

Next, in block 120, a normalized score 109 is generated based on a respective base score 105 and normalized weight 107. For example, a first normalized score 109A is generated based on the first base score 105A and the first normalized weight 107A. The normalized scores 109 may then be used to rank the candidate images 103 and/or select one or more candidate images 103 as being similar to the query image 101.

Figure 2:
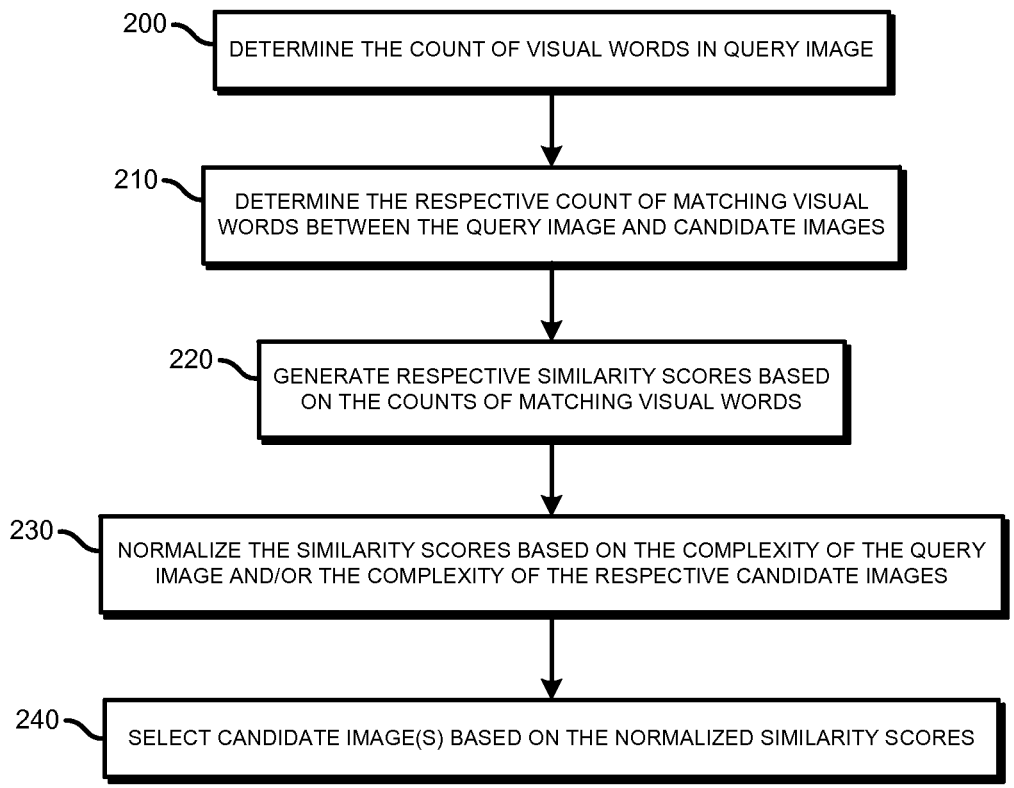
FIG. 2 illustrates an example embodiment of a method for generating an image similarity score.

FIG. 2 illustrates an example embodiment of a method for generating an image similarity score. Also, other embodiments of this method and the other methods described herein may omit blocks, add blocks, change the order of the blocks, combine blocks, and/or divide blocks into multiple blocks. Additionally, the methods described herein may be implemented by the systems and devices described herein.

The flow starts in block 200, where the count Q of visual words in a query image q is determined. Next, in block 210, the respective counts of matching visual words (e.g., shared visual words) in the query image and the candidate images are determined, where the number of visual words in candidate image j is denoted $I_j$. The flow then proceeds to block 220, where respective similarity scores (denoted $similarity_i$) are generated based on the counts of matching visual words. The flow then moves to block 230, where the similarity scores $similarity_i$ are normalized based on the complexity of the query image, the complexity of the respective candidate images, or both, in order to generate a normalized score $score_j$. The similarity scores $similarity_i$ may be normalized based on a normalization weight $norm_j$.

In some embodiments, the normalization weight is generated from a unimodal normalization function that is based on the number of visual words, with a peak at the number of visual words Q in the query image q. For example, the normalization function below gives a higher weight to a candidate image j that has the same number of visual words $I_j$ as the number of visual words Q in the query image. The normalization function contains a parameter C, which controls the width of a Gaussian Kernel function:

$$norm_j = e^{-\left(\frac{I_j - Q}{C}\right)^2}.$$

The normalization weight can be used to generate the normalized score $score_j$ by multiplying the base similarity score $similarity_j$ by the normalization weight $norm_j$ that was generated for the number of visual words $I_j$ in the candidate image j given the number of visual words Q in the query image q:

$score_j = similarity_j * norm_j$.

In some embodiments the normalization function is based on the difference of the number of visual words $I_j$ in the candidate image j and a monotonic function of the number of visual words Q in the query image q. Or more generally the normalization function is based on the difference of a monotonic function of the number of visual words $I_j$ in the candidate image j and a monotonic function of the number of visual words Q in the query image q.

In some embodiments, complexity is based on feature clustering, for example texture based feature clustering or Dense SIFT clustering. For example, some of these embodiments extract Dense SIFT features (or any other texture based features) using a window-based scheme from a particular image and cluster the extracted features using one or more clustering techniques, such as Hierarchical K-Means (H-KMeans) or Affinity Propagation, Canopy, etc. Also for example, if H-KMeans clustering is used to cluster the features, a predefined leaf-distance threshold T can be employed to instruct the H-KMeans algorithm to stop dividing the tree if the threshold is reached. The resulting number of clusters (e.g., affinity propagation) or the number of leaf nodes (e.g., H-KMeans clustering) can be used to represent the complexity (e.g., Q or $I_j$) of the image.

Furthermore, some embodiments divide an image into segments based on color or texture patches. These embodiments account for the location of a given pixel or texture patch. The number of generated segments (clusters) can be used to represent the complexity (e.g., Q or $I_j$) of the image.

Figure 3:
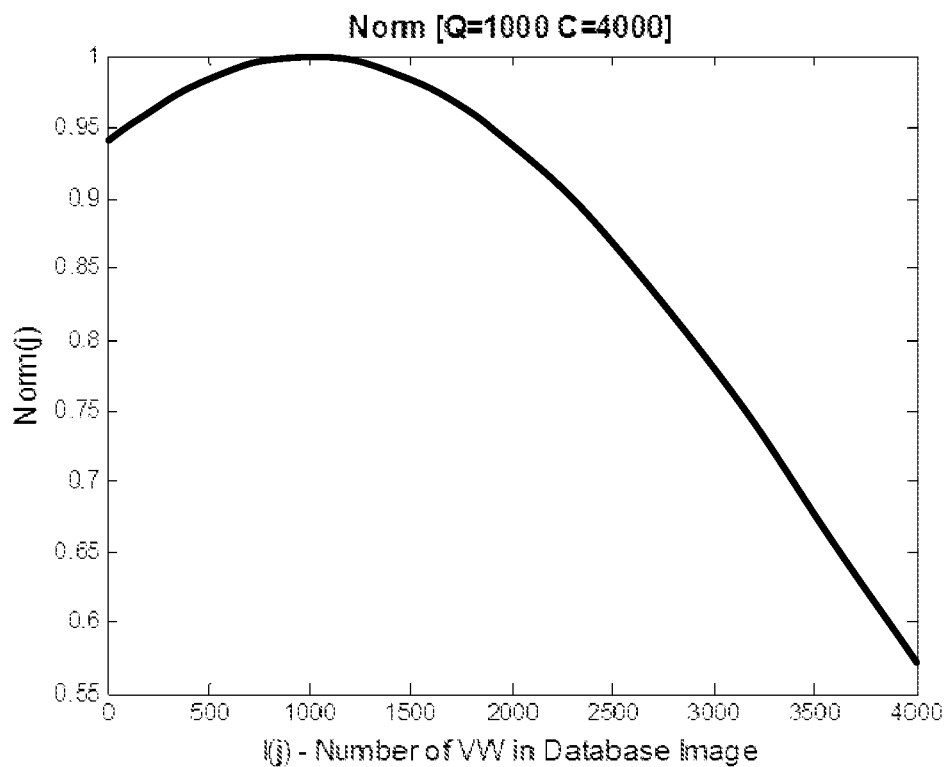
FIG. 3 illustrates the normalization weights for a query image that contains 1000 visual words, where C is set to 4000.

FIG. 3 demonstrates the normalization weights $norm_j$ for a query image q that includes 1000 visual words (Q=1000), where C is set to 4000. As shown, the normalization weight $norm_j$ for a candidate image j is based on the number of visual words in the candidate image j.

In some embodiments, the normalization function has a different form. For example, the form could follow another unimodal function, such as a Poisson distribution, a Rayleigh distribution, etc. In some embodiments the normalization function is not unimodal. For example, the function could be learned through the results of user surveys where the users rank the most relevant images to a query image from a list of candidate images and where the normalization function is determined based on a normalization of the results to the number of query visual words and fit to a curve.

The table below shows retrieval accuracy using a particular similarity measure on the ImageNet dataset. The results show improved accuracy when the similarity scores are normalized.

| Similarity Measure | K Nearest Neighbors (KNN) = 10 | | |
|---|---|---|---|
| | Top-Match (#1 result) | Top-Rank (# @ KNN) | At-Least-One in KNN |
| Cosine - without normalization | 8.3% | 10.2% | 15.2% |
| Cosine - with normalization | 8.7% | 10.8% | 16.0% |
| Histogram Intersection - without normalization | 9.2% | 9.6% | 14.9% |
| Histogram Intersection - with normalization | 11.4% | 13.9% | 19.2% |

Figure 4:
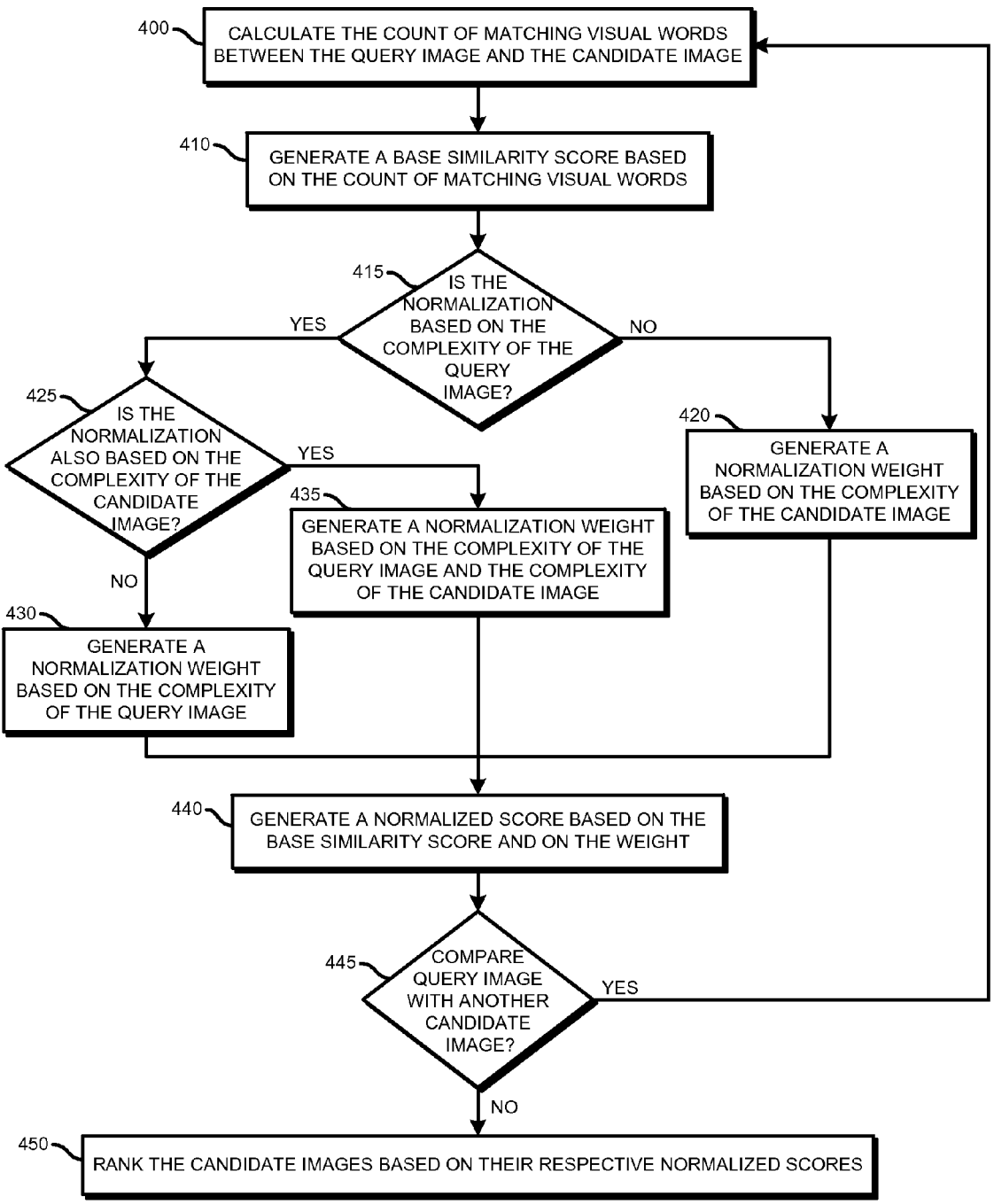
FIG. 4 illustrates an example embodiment of a method for generating an image similarity score.

FIG. 4 illustrates an example embodiment of a method for generating an image similarity score. The flow starts in block 400, where the count of matching visual words between the query image and a candidate image is calculated. Following, a base similarity score is generated in block 410 based on the count of matching visual words. The flow then proceeds to block 415, where it is determined if the normalization is based on the complexity of the query image. If not (block 415=NO), then the flow proceeds to block 420, where a normalization weight is generated based on the complexity of the candidate image, and then the flow proceeds to block 440 (described below).

If in block 415 it is determined that the normalization is based on the complexity of the query images (block 415=YES), then the flow proceeds to block 425, where it is determined if the normalization is also based on the complexity of the candidate image. If not (block 425=NO), then the flow proceeds to block 430, where a normalization weight is generated based on the complexity of the query image, and then the flow proceeds to block 440. If yes (block 425=YES), then the flow proceeds to block 435, where a normalization weight is generated based on the complexity of the query image and the complexity of the candidate image, and then the flow moves to block 440.

In block 440, a normalized similarity score is generated based on the base similarity score and on the weight. The flow then moves to block 445, where it is determined if the query image is to be compared with another candidate image. If yes (block 445=YES), then the flow returns to block 400, and a normalized score is generated for another candidate image. If no (block 445=NO), then the flow proceeds to block 450, where the candidate images are ranked based on their respective normalized scores.

Figure 5A:
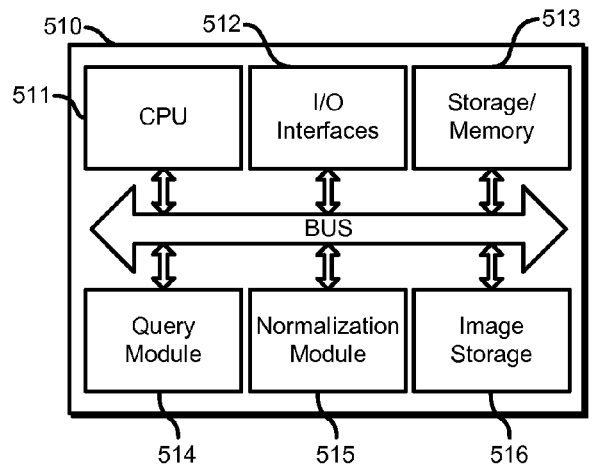
FIG. 5A illustrates an example embodiment of an image analysis system.

FIG. 5A illustrates an example embodiment of an image analysis system. The system includes an image analysis device 510. The image analysis device 510 includes one or more processors (CPU) 511, I/O interfaces 512, storage/memory 513, and image storage 516. The CPU 511 includes one or more central processing units (e.g., microprocessors, single core processors, multi-core processors) and is configured to read and perform computer-executable instructions, such as instructions stored in the modules. The computer-executable instructions may include those for the performance of the methods described herein. The I/O interfaces 512 provide communication interfaces to input and output devices, which may include a keyboard, a display, a mouse, a printing device, a touch screen, a light pen, an optical storage device, a scanner, a microphone, a camera, a drive, and a network (either wired or wireless).

Storage/memory 513 includes one or more computer readable/writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. Storage/memory 513 may store computer-readable data and/or computer-executable instructions. Also, image storage 516 includes one or more computer-readable media that store images (e.g., candidate images). The components of the image analysis device 510 communicate via a bus.

The image analysis device 510 also includes a query module 514 and a normalization module 515. Modules include logic, computer-readable data, and/or computer-executable instructions; may be implemented in software (e.g., Assembly, C, C++, C#, Java, BASIC, Perl, Visual Basic), firmware, and/or hardware; and are stored on one or more computer-readable media. In some embodiments, the image analysis device 510 includes additional or fewer modules, the modules are combined into fewer modules, or the modules are divided into more modules. Though the computing device or computing devices that execute a module actually perform the operations, for purposes of description a module may be described as performing one or more operations. The query module 514 includes instructions that, when executed by the image analysis device 510, cause the image analysis device 510 to receive one or more query image(s), count matching visual words between the query image(s) and candidate images, generate base similarity scores, and rank candidate images based on the scores (e.g., base similarity scores, normalized scores). The normalization module 515 includes instructions that, when executed by the image analysis device 510, cause the image analysis device 510 to generate normalization weights and generate normalized scores.

Figure 5B:
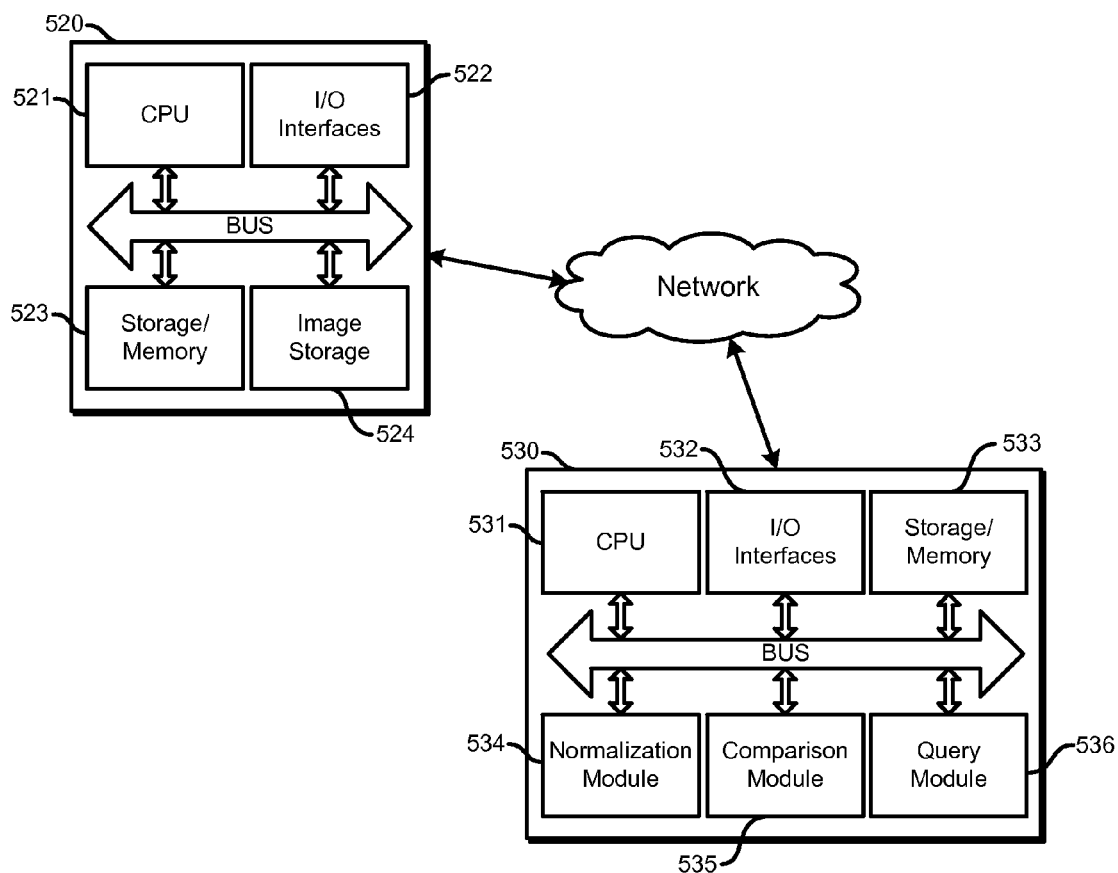
FIG. 5B illustrates an example embodiment of an image analysis system.

FIG. 5B illustrates an example embodiment an image analysis system. The system includes an image storage device 520 and an image analysis device 530. The image storage device 520 includes one or more CPUs 521, I/O interfaces 522, storage/memory 523, and image storage 524. The image analysis device 530 includes one or more CPUs 531, I/O interfaces 532, storage/memory 533, a normalization module 534, a comparison module 535, and a query module 536. In the embodiment shown in FIG. 5B, the query module 536 receives one or more query images, and the comparison module 535 obtains candidate images from the image storage device 520, counts matching visual words between the query image(s) and candidate images, generates base similarity scores, and ranks candidate images based on the normalized scores that were generated by (e.g., normalized by) the normalization module.

Figure 6:
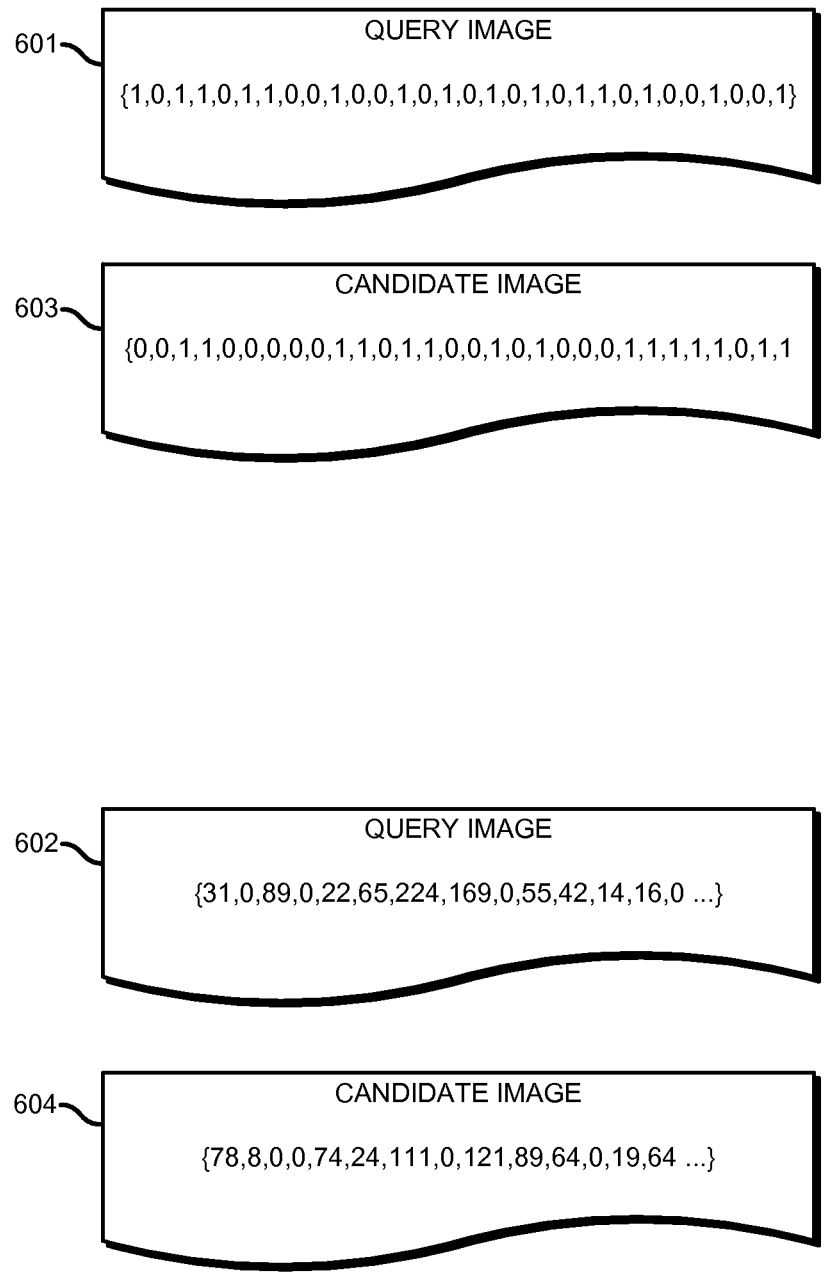
FIG. 6 illustrates example embodiments of BOW representations of images.

FIG. 6 illustrates example embodiments of BOW representations of images. In one embodiment, a BOW representation of an image, including a first query image 601 and a first candidate image 603, includes a vector of binary values, where 1 indicates that the visual word at the index is included in the image and 0 indicates that the visual word is not included in the image. In a second embodiment, a BOW representation of an image, including a second query image 602 and a second candidate image 604, includes values that indicate how many of the visual words are included in the image. For example, a 31 at the first index of the vector of the query image 602 indicates that the query image 602 includes 31 instances of the first visual word.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems and/or devices perform the operations of the above-described embodiments when executing the computer-executable instructions. Also, an operating system on the one or more systems and/or devices may implement the operations of the above described embodiments. Thus, the computer-executable instructions and/or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

The scope of the claims is not limited to the above-described embodiments and includes various modifications and equivalent arrangements.

What is claimed is:

1. An image similarity scoring method comprising:
   counting a number of matching visual words between a query image and a candidate image, wherein each matching visual word is found in both the query image and the candidate image;
   generating an image similarity score for the query image and the candidate image based at least in part on the counted number of matching visual words; and
   generating a normalized image similarity score based at least in part on the image similarity score and one or more of a complexity of the query image and a complexity of the candidate image, wherein the normalized image similarity score is generated according to a weighting function that is described by a finite unimodal function.

2. A method according to claim 1, further comprising ranking the candidate image relative to a plurality of other candidate images based on their respective normalized image similarity scores.

3. A method according to claim 1, wherein the finite unimodal function has a peak at the complexity of the query image.

4. A method according to claim 3, wherein the finite unimodal function is given by $$\exp\left(-\left(\frac{f(I_j)-g(Q)}{C}\right)^2\right),$$

where $f$ is a non-constant monotonic function, g is a monotonic function, $I_j$ represents a number of visual words in the candidate image, Q represents a number of visual words in the query image, and C is a predetermined constant.

5. A method according to claim 3, wherein the finite unimodal function is given by $$e^{-\left(\frac{I_j-Q}{C}\right)^2},$$

where $I_j$ represents a number of visual words in the candidate image, Q represents a number of visual words in the query image, and C is a predetermined constant.

6. A method according to claim 1, wherein the normalized image similarity score is also based on user ratings of query results.

7. A method according to claim 3, wherein the complexity of the query image is described by a number of visual words in the query image, and wherein the finite unimodal function has a peak at the number of visual words in the query image.

8. A device comprising:
one or more processors; and
one or more computer readable media coupled to the one or more processors, the one or more computer-readable media storing instructions that, when executed by the one or more processors, cause the processors to perform operations comprising
counting a number of matching visual words between a query image and a candidate image, wherein each matching visual word is found in both the query image and the candidate image,
weighting the number of matching visual words between the query image and the candidate image according to a finite unimodal function, wherein the weighting is based at least in part on a complexity of the query image, and
scoring an image similarity of the query image and the candidate image based at least in part on the weighted number of matching visual words.

9. A device according to claim 8, wherein the weighting of the number of matching visual words is further based on a complexity of the candidate image.

10. A device according to claim 8, wherein the complexity is based on one feature measure.

11. A device according to claim 10, wherein the feature measure is one of SIFT, CHoG, SURF, HOG, GLOH, and LESH.

12. A device according to claim 8, wherein the complexity is based on two or more feature measures.

13. A device according to claim 8, wherein the complexity is based on a density of features.

14. A device according to claim 8, wherein the complexity is based on a number of semantic labels assigned to an image.

15. One or more non-transitory computer-readable media storing instructions that, when executed by one or more computing devices, cause the one or more computing devices to perform operations comprising:
counting a number of matching visual words between a query image and a candidate image, wherein each matching visual word is found in both the query image and the candidate image;
generating an image similarity score for the query image and the candidate image based at least in part on the number of matching visual words; and
generating a normalized image similarity score based on the image similarity score and a complexity of the query image, wherein the normalized image similarity score is generated according to a finite unimodal function.

16. The one or more non-transitory computer-readable media of claim 15, wherein the normalized image similarity score is further based on a number of repeated visual words in the query image or in the candidate image.

17. The device of claim 8, wherein the finite unimodal function has a peak at the complexity of the query image.

18. The device of claim 17, wherein the finite unimodal function is given by $$\exp\left(-\left(\frac{f(I_j)-g(Q)}{C}\right)^2\right),$$

where $f$ is a non-constant monotonic function, g is a monotonic function, $I_j$ represents a number of visual words in the candidate image, Q represents a number of visual words in the query image, and C is a predetermined constant.

19. The one or more non-transitory computer-readable media of claim 15, wherein the finite unimodal function has a peak at the complexity of the query image.

20. The one or more non-transitory computer-readable media of claim 19, wherein the finite unimodal function is given by $$e^{-\left(\frac{I_j-Q}{C}\right)^2},$$

where $I_j$ represents a number of visual words in the candidate image, Q represents a number of visual words in the query image, and C is a predetermined constant.

* * * * *